Aug. 9, 1949.  E. R. TAYLOR  2,478,512
FOLDING STROLLER

Filed Oct. 24, 1947  2 Sheets-Sheet 1

INVENTOR.
Edgar R. Taylor,
BY
ATTORNEY.

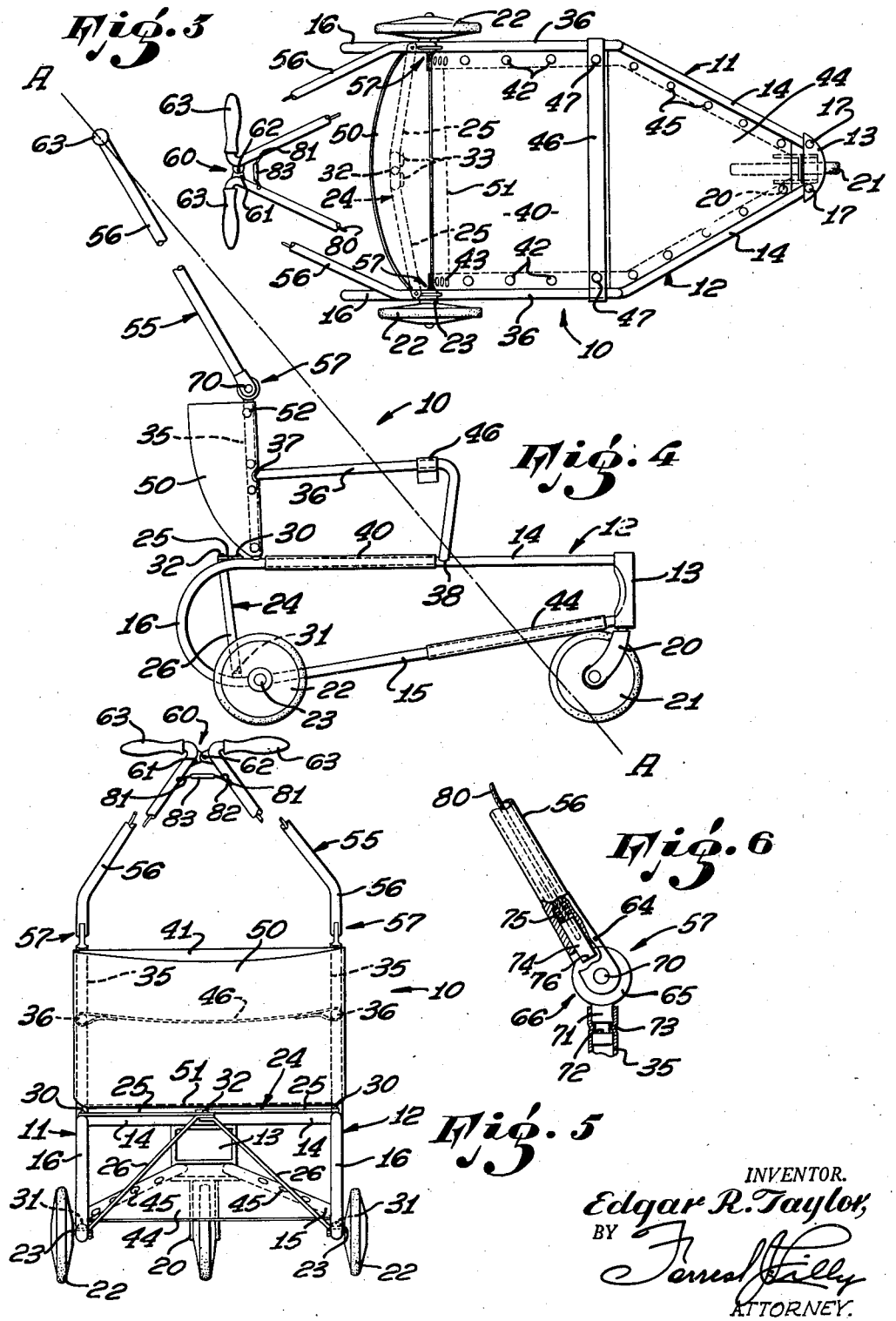

Patented Aug. 9, 1949

2,478,512

UNITED STATES PATENT OFFICE 2,478,512

FOLDING STROLLER

Edgar R. Taylor, Santa Monica, Calif.

Application October 24, 1947, Serial No. 781,778

6 Claims. (Cl. 280—42).

The present invention relates to strollers of the type used for the conveyance of small children, and one of the primary objects of the invention is to provide a new and improved folding stroller that can be collapsed quickly and easily to a compact form whereby it can be carried conveniently on public transportation vehicles or in an automobile, or stored in a minimum of space when not in use.

Another object of the invention is to provide a folding stroller which is so constructed that it can be collapsed with only one hand, while holding the child and any packages in the other hand; the spreading brace for holding the sides of the stroller apart being folded by kicking forwardly against its center portion. One of the advantages of this arrangement is that it eliminates the need for setting the child and any packages down on the ground while folding the stroller, and enables the stroller to be collapsed and readied for carrying more quickly than if it were necessary to use both hands. Another advantage is that if the child is asleep, it can be picked up and held while the stroller is collapsed, without being awakened.

Another object of the invention is to provide a stroller which is constructed to provide a pair of curved bumpers or runners projecting rearwardly behind the rear wheels, which can be used to engage the curb or steps when letting the rear wheels down, whereby the stroller can be lowered gently by sliding it down on the runners, without jarring the child occupying the seat.

A further object of the invention is to provide a stroller wherein the child's legs are enclosed and confined by the frame, so that they are protected against injury.

Another object of the invention is to provide a tricycle stroller which is constructed and arranged so as to be stable when supported solely by the front wheel and handle grips, as when mounting a curb; and which is further stabilized by the weight of the child. This object is accomplished by constructing the stroller so that the seat and back rest, as well as the greater part of the frame, lie below a line connecting the point of ground contact of the front wheel with the handle grips. Thus, when the stroller is being lifted up by its front wheel onto a curb, the center of gravity of the frame and the child carried therein hangs below the line of support, and therefore resists any tendency to overturn.

Another object of the invention is to provide a stroller wherein the seat, back rest, and foot rest are made of canvas or other washable material which is detachably secured to the frame so that, when soiled, they can be removed quickly and easily for laundering in a washing machine.

Still another object of the invention is to provide a folding stroller that is attractive in appearance, light in weight, and simple and inexpensive to manufacture.

The foregoing and other objects and advantages of the invention will become apparent to those skilled in the art upon consideration of the following detailed description of the preferred embodiment thereof, reference being had to the accompanying drawings, in which:

Figure 3 is a top plan view of the stroller;

Figure 4 is a side elevational view of the same;

Figure 5 is a rear end elevational view; and

Figure 6 is an enlarged, partially sectioned side elevational view of the hinge connection between the handle and the stroller body.

Figure 1:
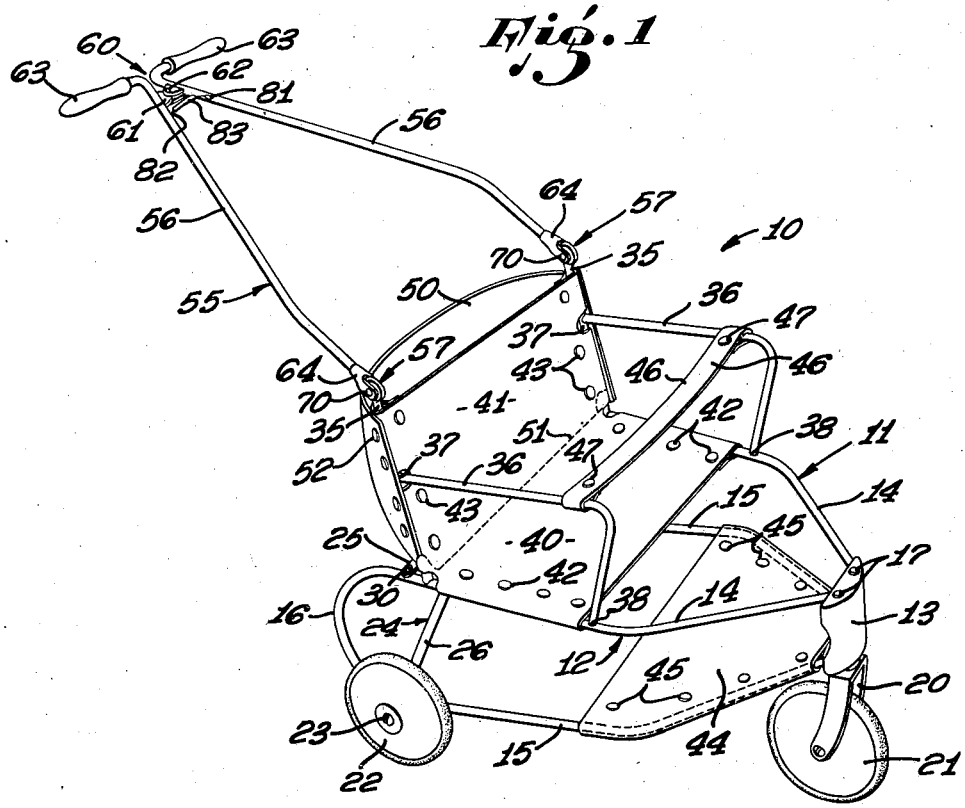
Figure 1 is a perspective view of a stroller constructed in accordance with the principles of the invention.

In the drawings, the stroller of the invention is designated in its entirety by the reference numeral 10 and comprises a body having a pair of side frame sections 11 and 12 which are pivotally connected at their front ends to a front wheel support casting 13. Each of the two side frames 11 and 12 is made of steel tubing which is bent to form vertically spaced, fore and aft extending upper and lower portions 14 and 15, connected at their rear ends by a rearwardly curved, vertically extending bumper portion 16. The upper portion 14 of the tubing is substantially horizontal, while the lower portion 15 is inclined upwardly at a slight angle from its rear end. Both the upper and lower portions 14 and 15 of each side frame are bent laterally inward at their mid points, so that when the stroller is extended, as in Figure 1, the front end sections converge forwardly, while the rear and lower portions of the frame tubing extend into suitable sockets provided in the back of the front wheel support casting 13, and are pivotally connected thereto for lateral swinging movement by pivot pins 17.

Swiveled on the castings 13 and projecting downwardly therefrom is a fork 20, and rotatably mounted between the two side arms of the fork is a rubber tired front wheel 21. The axis of the wheel 21 is offset slightly to the rear of the turning axis of the fork 20, giving the wheel the trailing characteristic of a caster wheel. The stroller 10 is supported at its rear end on a pair of rear wheels 22 rotatably mounted on stub axles 23 which are fixed to the lower portion 15 of the side frame tubing just ahead of the bumper portion 16.

The side frames 11, 12 are spread apart at their rear ends by a folding brace 24 comprising two pairs of laterally inwardly extending members 25 and 26 which are pivotally connected at 30 and 31 to the frame portions 14 and 15, respectively, for horizontal swinging movement. The bottom member 26 of each pair extends upwardly at an angle from its point of attachment with the frame portion 15, and the inner ends of the two pairs of members are joined together at the mid point of the brace 24, by a rivet 32 which serves as a hinge pin. The inner ends of the two top members 25 extend somewhat beyond the hinge pin 32, and each is provided along its front edge with a limit stop projection 33 which engages the other member to limit rearward folding of the brace 24 to the over-center locked position shown in Figure 3, wherein the hinge pin 32 is disposed behind a line connecting the pivots 30. The brace 24 breaks forwardly from this locked position, and can be folded by kicking against the center portion thereof, to bring the side frames 11 and 12 together.

Welded to the upper portion 14 of each of the sides frames 11, 12, just ahead of the brace 24, is an upwardly extending tubular post 35 which supports the back rest for the seat. Arm rest 36 of bent steel tubing are welded at 37 to the posts 35, and at 38 to the upper portions 14 of the side frames 11, 12.

A seat 40 and back rest 41 of canvas or other flexible material is detachably fastened in any suitable manner to the tubular steel frame of the stroller, and is adapted to be stretched tight when the stroller is extended, as shown in Figure 1. In the preferred method of attaching the seat to the frame, the side edges of the canvas panel are passed over and around the upper tubular portion 14 of the side frames 11, 12, and are secured to the bottom of the panel by snap fasteners 42. The back rest 41 is also attached to the post 35 by passing the side edges of the fabric panel around the post and securing them to the back of the panel by snap fasteners 43. A canvas foot rest 44 is similarly attached to the lower portion 15 of each of the side frames 11, 12 in the forwardly converging front section thereof; the side edges of the canvas being passed over and around the tubular frame members and secured to the bottom of the panel by snap fasteners 45. A strap 46 is provided to hold the child in the seat of the stroller, and the ends of the strap are looped around the arm rests 36 and detachably secured by snap fasteners 47. When the seat 40, back rest 41, foot rest 44, and strap 46 become soiled, it is a simple matter to unsnap the fasteners and remove the fabric panels so that they can be laundered in a washing machine.

Mounted on the back of the stroller is a package carrier 50 comprising a fabric panel which is stitched along its bottom edge at 51 to the canvas back rest 41. The side edges of the panel 50 are provided with the female elements of snap fasteners 52, and these are adapted to engage companionate male elements (not shown) on the side edges of the back rest 41 where the latter passes around the posts 35. The panel 50 is made somewhat wider than the back rest 41, and is therefore slack when the back rest is taut, forming a pocket of considerable capacity for carrying packages.

Figure 2:
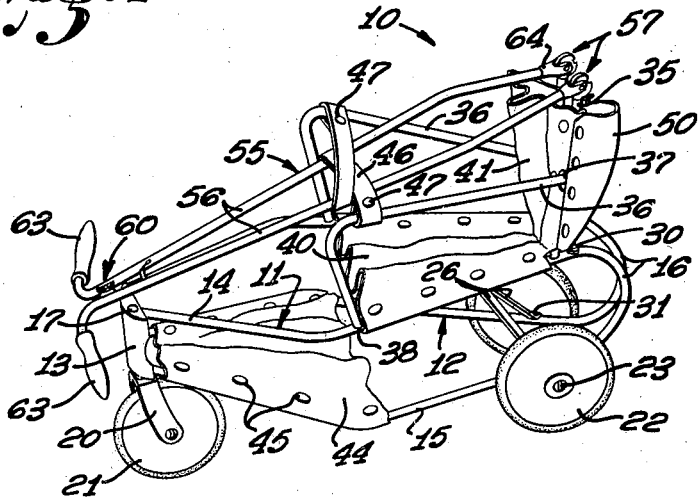
Figure 2 is another perspective view of the same in the collapsed condition.

The stroller 10 is provided with a handle 55 which is connected to the body frame for vertical swinging movement between the rearwardly extending operative position, shown in Figure 1, and a forwardly extending inoperative position, depicted in Figure 2. The handle 55, which will be described now with reference to its operative position, comprises two tubular members 56 that are pivotally connected at 57 to the top end of the posts 35, and extend upwardly and rearwardly therefrom in converging relationship. Adjacent their outer ends, the members 56 are joined together by a hinge connection 60 comprising two ears 61 which overlap and are connected by a pin 62. Rearwardly of the hinge 60, the members 56 are bent laterally outward and provided with handle grips 63.

The pivoted connection 57 between each of the handle members 56 and the top end of its respective post 35 consists of a fork 64 having a shank which is inserted into and welded to the bottom end of the tube 56. The spaced arms of the fork 64 embrace the flat, circular head 65 of a fitting 66, and are connected thereto by a pin 70. The fitting 66 has a shank 71 which is inserted down into the top end of the post 35, and this shank has a circumferential groove 72 formed therein. The wall of the tube 35 is crimped into the groove 72 so as to hold the shank 71 in the tube, while permitting the fitting 66 to swivel therein. The purpose of this arrangement is to permit the fitting 66 to accommodate the slight amount of rotation between the handle member 56 and post 35 which occurs when the side frames of the stroller are brought together to the collapsed position.

The handle 55 is adapted to be locked in its operative position by latch means in the form of two detents 74, each of which is slidably disposed within a bore formed in one of the forks 64. Each of the detents 74 is urged against the periphery of the circular head 65 of its respective fitting 66 by a spring 75, and is adapted to seat in a notch 76 in the head 65 to lock the handle member 56 against swinging movement about the axis of pin 70.

The detents 74 of the two pivot connections 57 are adapted to be released from the notches 76 by means of a pull cord 80, the ends of which are attached to the detents. The pull cord 80 extends up through the center of the tubular handle members 56 and passes from one member to the other through openings 81 adjacent the handle grips 63, leaving an exposed portion 82 which can be grasped and pulled to unseat the detents 74 from their respective notches against the pressure of the springs 75. A tubular sleeve 83 is provided on the exposed portion 82 of the pull cord to form a handle for the cord.

One of the advantageous features of the invention resides in the inherent stability of the stroller when supported solely on the front wheel 21 and handle grips 63, as when mounting a curb. This stability derives from the fact that the greater part of the structure of the stroller lies below a line A—A (Figure 4) drawn through the handle grips 63 and the point of contact of the front wheel 21 with the ground, and as a result, the center of gravity of the empty stroller is disposed well below the points of support. In addition to being stable when empty, the stroller is further stabilized by the weight of the child in the seat, and by packages in the carrier 50, due to the disposition and arrangement of the seat 40 and back rests 41 below the line A—A, whereby the center of gravity of the child and of the packages contributes a stabilizing moment that is added to the stabilizing moment of the empty stroller.

To fold the stroller 10 from the extended position of Figure 1 to the collapsed position of Figure 2, the brace 24 is kicked forwardly at its midportion to fold the side frames 11 and 12 together, and at the same time, the handle 83 on the pull cord 80 is pulled to release the detents 74 from their respective notches in the members 75. When the detents 74 have been released, the handle 55 is folded forwardly to the position shown in Figure 2, and is secured in place by unsnapping one of the fasteners 47 and wrapping the strap 46 around the collapsed handle, after which the end of the strap is refastened to its respective arm rest. When thus collapsed, the stroller forms a compact bundle which can be carried on public transportation vehicles or stowed away in a private automobile with no difficulty. The location of the pull cord handle 83 closely adjacent the handle grip 63, together with the forwardly breaking brace 24 which can be kicked forwardly with the foot to fold the side frames of the stroller together, enables the person handling the stroller to collapse it with only one hand, while holding the child and any packages in the other.

Another advantageous feature of the stroller is in the provision of the curved bumpers or runners 16 projecting rearwardly behind the wheels 22, which enable the stroller to be let down gently from high curbs. As the wheels 22 are lowered over the edge of the curb, the runners 16 engage the curb, and the stroller is thereafter allowed to slide down on the runners until the wheels touch the ground again.

While I have shown and described in considerable detail what I believe to be the preferred form of my invention, it is to be understood that such details are not restrictive, and that various changes may be made in the shape and arrangement of the several parts without departing from the scope of the invention as defined in the appended claims.

I claim:

1. A folding stroller comprising a pair of side frames pivotally connected at their front ends to a front wheel support member for lateral swinging movement, a pair of rear wheels mounted on said frames adjacent the rear ends thereof, bracing means connecting the rear end portions of said side frames to hold the same spread apart, said bracing means being collapsible from an extended position to permit said side frames to be brought together, a handle comprising two members which are pivotally connected to said side frames for swinging movement between a rearwardly extending operative position and a forwardly extending collapsed position, said members being pivotally connected together at their outer ends, whereby the inner ends thereof are permitted to move together with said side frames when the stroller is collapsed, latch means for locking said handle members in said operative position, and means adjacent the outer ends of said handle members for releasing said locking means.

2. A folding stroller comprising a wheel supported body, a handle consisting of a pair of tubular members pivotally connected to said body at laterally spaced points thereon, and converging to a point of junction with one another adjacent their outer ends, said handle being swingable between a rearwardly extending operative position and a forwardly extending inoperative position, a pair of spring pressed detents slidably disposed within said tubular members and engageable with companionate members on said body to lock said handle in said operative position, and a pull cord connected at each of its ends to one of said detents, said cord extending through the hollow interior of each of said tubular members and passing from one member to the other through openings in the side walls thereof adjacent the outer end of the handle to provide an exposed portion that can be grasped by the hand and pulled to release said detents from their respective companionate members.

3. A folding stroller comprising a wheel supported, collapsible body having sides that are normally spaced apart and which are adapted to be brought together when the body is collapsed, a handle consisting of a pair of tubular members which are pivotally connected to said body sides for swinging movement between a rearwardly extending operative position and a forwardly extending inoperative position, said members being pivotally connected together adjacent their outer ends to permit the inner ends thereof to come together with said body sides, latch means on each of said members for locking said handle in said operative position, and a pull cord operatively connected at each end thereof to one of said latch means, said pull cord extending through the hollow interior of said members and from one member to the other through openings adjacent the outer end of the handle, whereby to provide an exposed portion that can be grasped and pulled to release said latch means and permit said handle to be folded to said inoperative position.

4. A folding stroller comprising a pair of side frames pivotally connected at their front ends to a front wheel support member for lateral swinging movement, a pair of rear wheels mounted on said frames adjacent the rear ends thereof, collapsible bracing means connecting the rear end portions of said frames to hold the same spread apart, a handle comprising two tubular members which are pivotally connected to said side frames for swinging movement between a rearwardly extending operative position and a forwardly extending collapsed position, said members being pivotally connected together adjacent their outer ends, whereby the inner ends thereof are permitted to move together with said side frames, a pair of spring pressed detents slidably disposed within said tubular members adjacent the inner ends thereof, said detents being engageable with companionate members on said side frames to lock said handle in said operative position, and a pull cord connected at each end to one of said detents, said cord extending through the hollow interior of said tubular members and from one member to the other through openings adjacent the outer end of the handle, whereby to provide an exposed portion that can be grasped and pulled to release said detents from their respective companionate members.

5. A folding stroller comprising a pair of side frames pivotally connected at their front ends to a front wheel support member for lateral swinging movement, each of said frames including a tube bent to form vertically spaced, fore and aft extending top and bottom portions, a pair of rear wheels mounted on said bottom portions of the tubes adjacent the rear ends thereof, a flexible seat bottom attached along its side edges to said top portion of the tubes, a flexible foot rest attached along its side edges to said bottom portion of the tubes adjacent the front ends thereof, collapsible bracing means connecting the rear ends of said side frames to hold the same spread apart, and a rearwardly extending handle connected to said side frames.

6. A folding stroller comprising a pair of side frames pivotally connected at their front ends to a front wheel support member for lateral swinging movement, each of said frames including a tube bent to form vertically spaced, fore and aft extending top and bottom portions connected at their rear ends by rearwardly curved bumper portions, a pair of rear wheels mounted on said bottom portions of the tubes ahead of said bumper portions, whereby when the rear wheels of the stroller are let down over a curb, said bumper portions slidably engage the edge of the curb and serve as runners, permitting the stroller to be eased down to the ground, a flexible seat bottom attached along its side edges to said top portion of the tubes, a flexible foot rest attached along its side edges to said bottom portion of the tubes adjacent the front ends thereof, collapsible bracing means connecting the rear ends of said side frames to hold the same spread apart, and a rearwardly extending handle connected to said side frames.

EDGAR R. TAYLOR.

REFERENCES CITED

The following references are of record in the file of this patent:

UNITED STATES PATENTS

| Number | Name | Date |
|---|---|---|
| 699,186 | Katzke | May 6, 1902 |
| 1,064,538 | Quickel | June 10, 1913 |
| 2,120,425 | Frey | June 14, 1938 |
| 2,179,275 | Sacheroff | Nov. 7, 1939 |
| 2,296,193 | Siebert | Sept. 15, 1942 |